US012281596B2

(12) United States Patent
Taguchi

(10) Patent No.: US 12,281,596 B2
(45) Date of Patent: Apr. 22, 2025

(54) METHOD FOR MANUFACTURING IMPELLER

(71) Applicant: HONDA MOTOR CO., LTD., Tokyo (JP)

(72) Inventor: Shu Taguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/769,499

(22) Filed: Jul. 11, 2024

(65) Prior Publication Data

US 2025/0092790 A1 Mar. 20, 2025

(30) Foreign Application Priority Data

Sep. 20, 2023 (JP) ................................ 2023-154002

(51) Int. Cl.
*F01D 5/26* (2006.01)
*F01D 5/02* (2006.01)

(52) U.S. Cl.
CPC ................. *F01D 5/26* (2013.01); *F01D 5/02* (2013.01); *F05D 2230/60* (2013.01); *F05D 2260/961* (2013.01)

(58) Field of Classification Search
CPC . F01D 5/045; F01D 5/048; F01D 5/10; F01D 5/14; F01D 5/16; F01D 5/26; F01D 5/34; F05D 2260/961; F04D 29/66
See application file for complete search history.

(56) References Cited

U.S. PATENT DOCUMENTS 8,172,510 B2 * 5/2012 Duong .................. F04D 29/666 416/500
10,066,489 B2 9/2018 Tanaka et al.
10,837,287 B2 * 11/2020 Abrari .................. F04D 29/284

FOREIGN PATENT DOCUMENTS

JP 5519835 B1 6/2014

* cited by examiner

*Primary Examiner* — Courtney D Heinle
*Assistant Examiner* — Danielle M. Christensen
(74) *Attorney, Agent, or Firm* — Armstrong Teasdale LLP

(57) ABSTRACT

In an impeller comprising a rotatable hub and a plurality of blades provided circumferentially on the rotatable hub at regular intervals, the blades including first blades each having a first vibrational eigenvalue and second blades each having a second vibrational eigenvalue, the first blades and the second blades are circumferentially arranged with a predetermined regularity in a circumferential direction in an alternating manner and with a mistune distribution that does not include a mistune component having a wavenumber twice a number of nodal diameters computed from $$H+ND=nN$$

where H is a rotational order of resonance under harmonic forced vibration, ND is a nodal diameter number in a traveling wave mode, n is an integer and N is a number of the blades.

4 Claims, 10 Drawing Sheets

METHOD FOR MANUFACTURING IMPELLER

TECHNICAL FIELD

The present invention relates to an impeller configured to be used, not exclusively, in a turbomachine or the like and in particular to an impeller manufactured by using intentional mistuning and a method for manufacturing the impeller.

BACKGROUND ART

An impeller for turbomachinery is provided with a plurality of blades (vanes) arranged at equal intervals along the outer periphery of a rotating hub or disk. Due to inevitable manufacturing errors and uneven wear in actual operation, the vibrational eigenvalue (resonant frequency) of each blade varies or mistuning of the blades arises. This mistuning typically arises in a random manner. In a tuned system where all the blades have a common eigenvalue, every blade behaves uniformly under a forced vibration situation of frequencies at multiples of the rotational speed of the impeller. However, in a mistuned system, each individual blade may demonstrate a different resonance behavior, or in other words, the resonance response amplification factor (AF) of each blade may differ from one another.

In response to demands for higher efficiency, lighter weight, and higher output for turbomachinery, impeller blades are often designed to have a small thickness and carry high loads so that a great care is required to minimize the risk of damage due to high cycle fatigue. The resonance response amplification due to random mistuning further increases the risk of damage due to high-cycle fatigue. Therefore, a great advantage can be gained in product development if a favorable technology that can control the resonance response amplification can be developed. Based on such considerations, active research efforts are being made in controlling the resonance response amplification by using intentional mistune distributions (hereinafter referred to as intentional mistuning).

According to the development methods often referred to as MBD (Model Based Development) and 1D CAE (1D Computer Aided Engineering) which are becoming popular in recent times, an accurate prediction of the characteristics and performance of each blade design can be made in advance so that the efficiency of the product development can be improved.

However, blade vibration response and intentional mistuning are greatly dependent on the blade configuration and aerodynamic conditions during impeller operation, and there are few examples of efforts that are based on the perspective of 1DCAE which aims to improve the characteristics at an early stage of development. In particular, most of the current research efforts on intentional mistuning aim at lowering the response as compared to that of a tuned system (lowering the resonance amplification factor to less than 1.0) by making use of the coupling of traveling wave (hereinafter referred to as TW) modes which involve a large aerodynamic damping.

JP5519835B1 (U.S. Pat. No. 10,066,489B2) discloses a tip shroud type impeller for an axial turbine based on intentional mistuning in which a resonance frequency under a two nodal diameter number mode of the rotating body is lower than or equal to a rotational secondary harmonic frequency with respect to a rated rotation speed of the rotating body, and when an order of a maximum mistuned component is defined as Nd among order components of mass distribution, rigidity distribution, or natural frequency distribution of the plurality of blades in a circumferential direction, the blades are arranged so as to satisfy Nd≥5, and have order components each having a ratio less than 1/2, the ratio being obtained by dividing the order component by a magnitude of the component of the order Nd.

The advantage of the impeller disclosed in JP5519835B can be gained only at the two nodal diameter number mode and rotational secondary harmonic frequency. However, in general, the blades of impellers used in turbo machinery have many natural vibration modes in particular in harmonic resonance induced by stationary blades in the normal operating range so that harmonic resonance of unexpected response amplifications may be caused due to mistuning.

The advantage of reducing the blade vibration response by the conventional distribution strategy of intentionally mistuning an impeller can be gained only with regard to specific resonance conditions where the blade configurations and operating aerodynamic conditions are comparatively clearly defined. Therefore, in applications such as aircraft engines where the operating ranges are wide, a large number of blades are subjected to similar harmonic forced oscillations and aerodynamic conditions vary significantly during operation, the desired advantage may not be gained.

It is therefore considered that the optimal intentional mistune design becomes possible only on at an advanced stage of development when the noteworthy resonance points for impeller operation (resonance points that are aimed to be suppressed) become clear. The required change in the design of the impeller due to this notable resonance points at this stage may even affect the basic blade configuration design of the blade with the result that the design process may be set back to an early stage of development. For this reason, a new technology is desired that allows the characteristics of the impeller to be determined without regard to the basic configuration or vibration mode of the impeller blade at an earliest possible stage of impeller development.

In view of the above background, a primary object of the present invention is to provide an impeller with an intentional mistuned blade arrangement that favorably suppresses an increase in the AF during harmonic resonance of notable rotational orders, regardless of the configuration or vibration modes of the impeller.

To achieve such an object, an aspect of the present invention provides an impeller, comprising: a rotatable hub (12); and a plurality of blades (16, 18) provided circumferentially on the rotatable hub at regular intervals, the blades including first blades each having a first vibrational eigenvalue and second blades each having a second vibrational eigenvalue, wherein the first blades and the second blades are circumferentially arranged with a predetermined regularity in a circumferential direction in an alternating manner and with a mistune distribution that does not include a mistune component having a wavenumber twice a number of nodal diameters computed from $$H+ND=nN \quad (1)$$

where H is a rotational order of resonance under harmonic forced vibration, ND is a nodal diameter number in a traveling wave (TW) mode, n is an integer and N is a number of the blades.

This blade arrangement of the blades of the impeller allows an increase in the AF during harmonic resonance of notable rotational order to be suppressed by intentional mistuning regardless of the configurations or vibration modes of the impeller.

Preferably, in this impeller, the first blades and the second blades are arranged alternately every two blades or every four blades.

According to this configuration, the first blades and the second blades are arranged symmetrically in the circumferential direction of the rotatable hub with the rotation center of the impeller as a symmetrical center, so that no unbalanced load is applied to the impeller when the impeller rotates.

To achieve such an object, another aspect of the present invention provides a method for manufacturing an impeller, the method comprising the steps of: preparing a rotatable hub (12); preparing a plurality of first blades (16) each having a first vibrational eigenvalue and a plurality of second blades (18) each having a second vibrational eigenvalue different from the first vibrational eigenvalue; positioning the first blade and the second blade with a predetermined regularity in a circumferential direction in an alternating manner so as to achieve a mistune distribution that does not contain a mistune Fourier component having a wave number twice a node diameter number ND as determined by a following equation $$H+ND=nN \quad (1)$$

where H is a rotational order of resonance under harmonic forced vibration, ND is a nodal diameter number in a traveling wave (TW) mode, n is an integer and N is a number of the blades.

This manufacturing method provides an impeller with a blade arrangement using intentional mistuning that suppresses an increase in the AF during harmonic resonance of notable rotational orders regardless of the configuration or vibration mode of the impeller.

Thus, the present invention provides an impeller with an intentional mistuned blade arrangement that favorably suppresses an increase in the AF during harmonic resonance of notable rotational orders, regardless of the configuration or vibration modes of the impeller.

DETAILED DESCRIPTION OF THE PREFERRED EMBODIMENT(S)

A turbine wheel or an impeller according to an embodiment of the present invention will be described in the following with reference to FIGS. 1 to 5.

Figure 1:
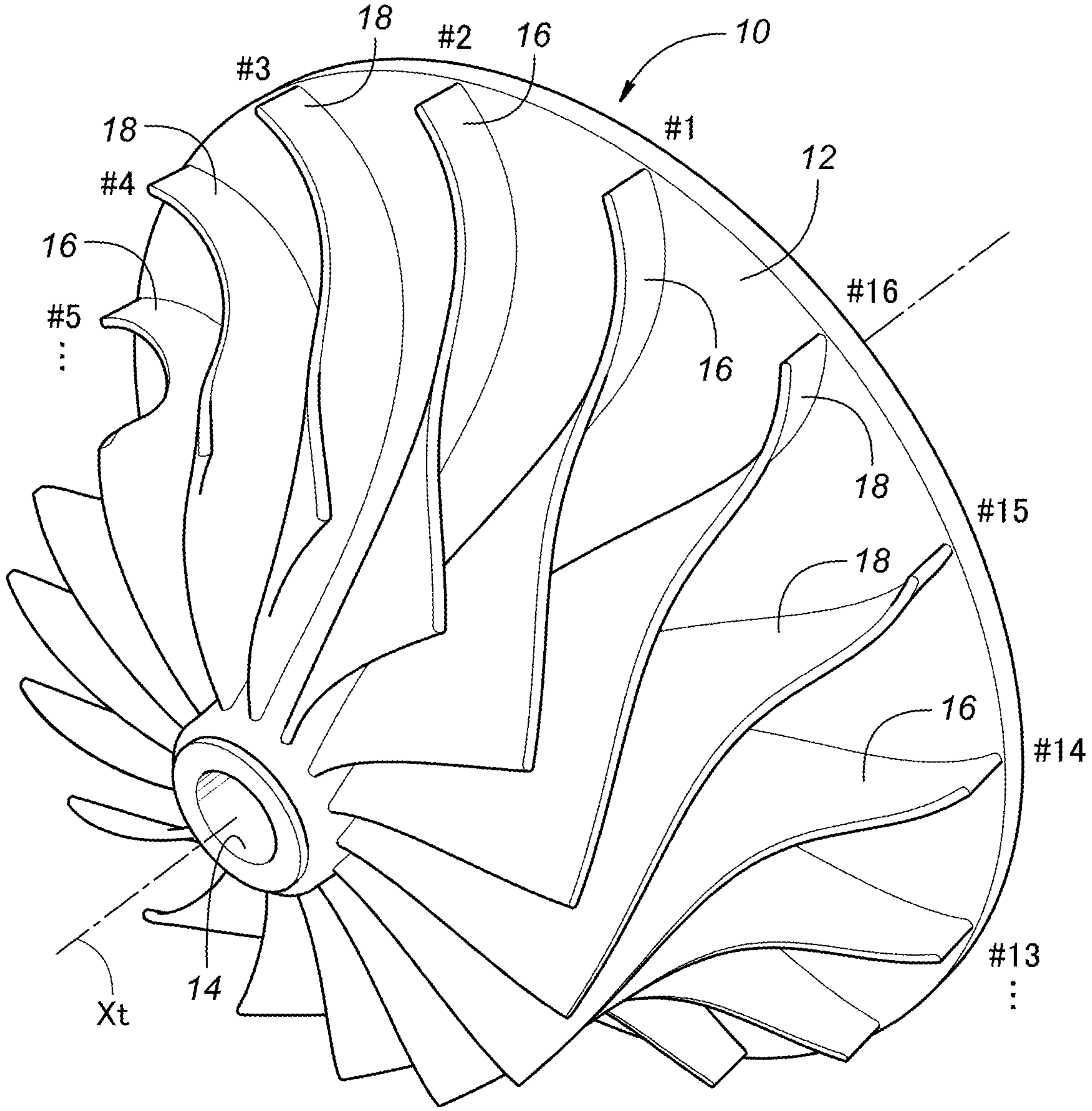
FIG. 1 is a perspective view showing an impeller according to an embodiment of the present invention.

As shown in FIG. 1, the impeller 10 of this embodiment includes a hub 12 substantially in the shape of a truncated cone. The hub 12 has a central hole 14 extending along the central axis Xt thereof through which a rotating shaft not shown in the drawing is fitted.

A plurality of blades 16 and 18 are provided on the outer circumferential surface of the hub 12 at equal intervals along the circumferential direction. More specifically, the blades include a plurality of first blades 16 and a plurality of second blades 18 arranged on the outer peripheral surface of the rotor core 12 at equal intervals and in a certain periodic pattern along the circumferential direction of the rotor core 12.

The first blades 16 each have a first vibrational eigenvalue, and the second blade 18 each has a second vibrational eigenvalue which is intentionally caused to be different from the first vibrational eigenvalue.

Figure 2:
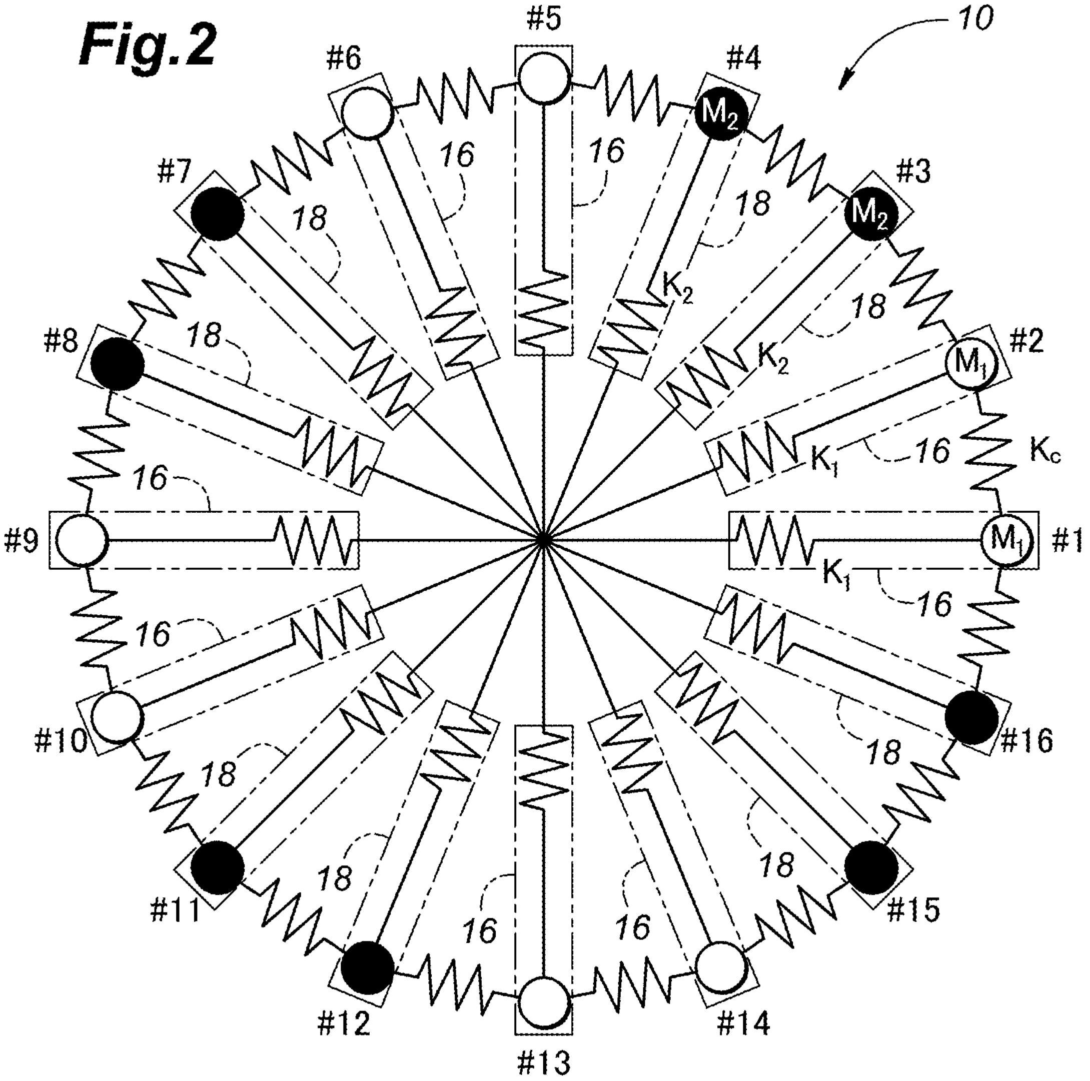
FIG. 2 is a vibration model diagram of the impeller of a first embodiment in which the first blades and the second blades are arranged alternately every two blades.

FIG. 2 shows a vibration model of the impeller 10 including the first blades 16 and the second blades 18. The first blades 16 are each modeled as a simple spring-mass system having a mass M1 and a spring constant K1 (rigidity), and the second blades 18 are each modeled as a simple spring-mass system having a mass M2 and a spring constant K2 (rigidity). The masses of each pair of adjacent blades 16 and 18 are connected to each other by the hub 12 with a spring constant Kc. Each first blade 16 has a first vibrational eigenvalue and each second blade 18 has a second vibrational eigenvalue different from the first vibrational eigenvalue because the mass M1 and the mass M2 are different from each other, and/or because the spring constant K1 and the spring constant K2 are different from each other.

In this model, the impeller 10 has a total of sixteen (16) blades consisting of eight (8) first blades 16 and eight (8) second blades 18 and constitutes an intentional mistuned impeller. In this particular example, the blades 16 and 18 are arranged in a pattern where first groups each consisting of two consecutive first blades 16 and second groups each consisting of two consecutive second blades are arranged in an alternating manner along the circumferential direction. This may be referred to as the every two alternating arrangements. For the convenience of description, the blades 16 and 18 are consecutively numbered with blade numbers #1 to #16 that increase in the counterclockwise direction as shown in FIG. 2.

Figure 3:
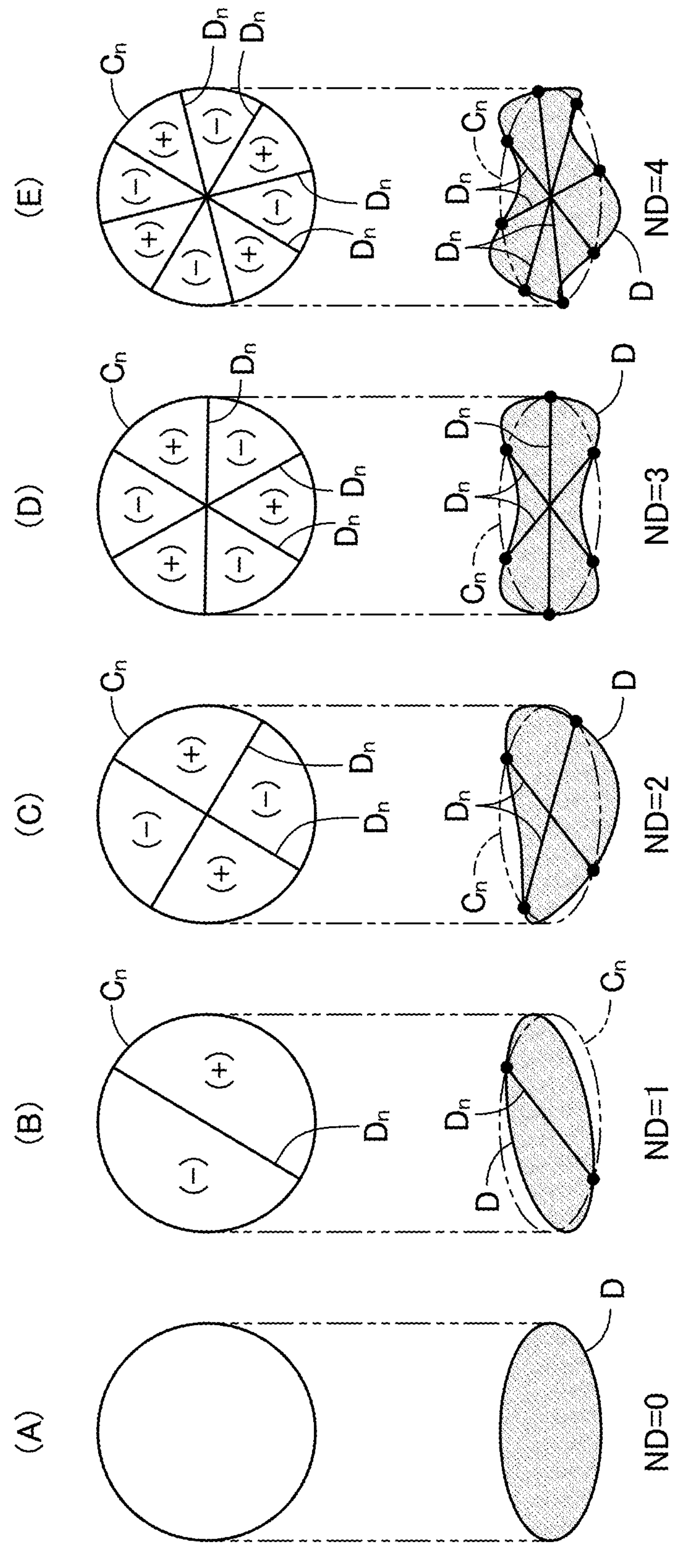
FIG. 3 is an explanatory diagram showing various traveling wave modes.

The impeller 10 is a periodic structure which can be modeled as a hypothetical disk D where it is supposed that a TW (traveling wave) mode vibration occurs as the wavy vibratory deflection of the peripheral edge. FIG. 3 shows diagrams representing different TW modes each in a top view at the top and a perspective view at the bottom.

(A) in FIG. 3 shows a vibration mode where the nodal diameter number ND=0 or there is no nodal diameter.

(B) in FIG. 3 shows a TW mode where the nodal diameter number ND=1 and wave number $\kappa$=1. This mode contains a single nodal diameter Dn that bisects the nodal circle Cn into two parts.

(C) in FIG. 3 shows a TW mode where the nodal diameter number ND=2 and wave number $\kappa$=2. This mode contains a pair of nodal diameters Dn that bisect the nodal circle Cn into four parts.

(D) in FIG. 3 shows a TW mode where the nodal diameter number ND=3 and wave number κ=3. This mode contains three nodal diameters Dn that bisect the nodal circle Cn into six parts.

(E) in FIG. 3 shows a TW mode where the nodal diameter number ND=4 and wave number κ=4. This mode contains four nodal diameters Dn that bisect the nodal circle Cn into eight parts.

In the upper part of (B) to (E) in FIG. 3, (+) indicates regions that deform in the opposite direction from the regions indicated by (−) while these regions are separated from one another by nodes, and (A) in FIG. 3 indicates absence of any node.

Figure 4:
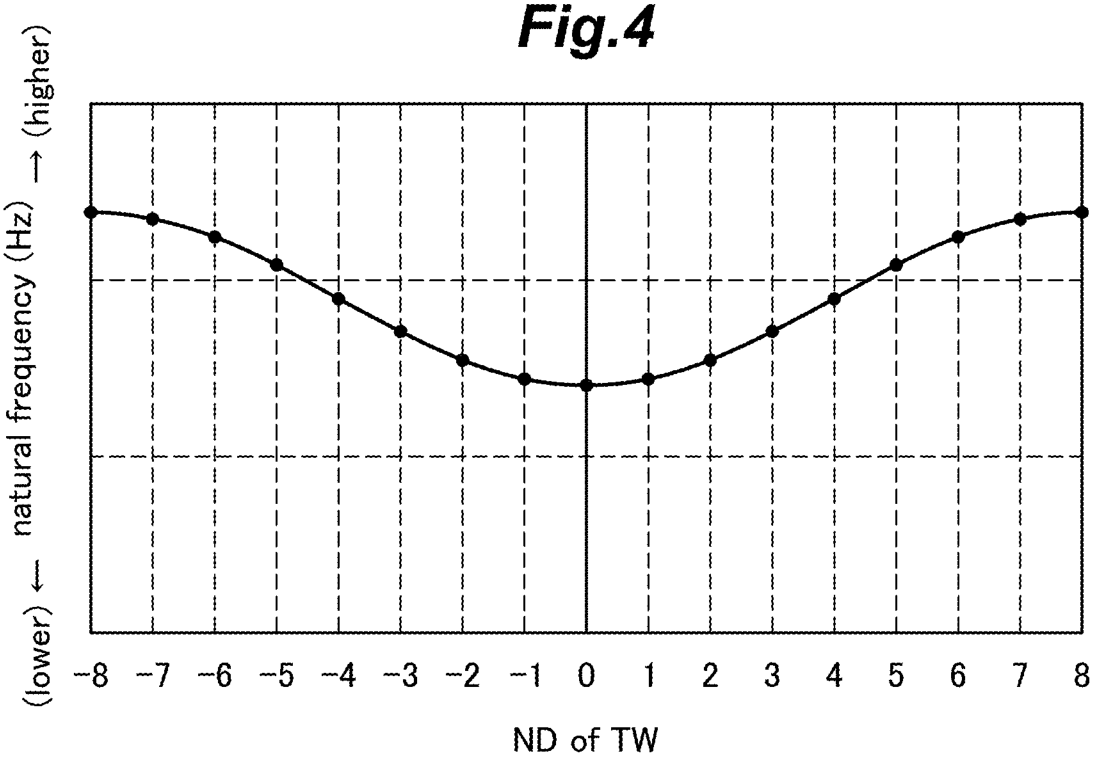
FIG. 4 is a graph showing the natural frequency characteristics of the blades of an impeller in a traveling wave mode.

FIG. 4 shows the natural frequency (frequency) of the impeller 10 of each TW mode of the impeller 10 where the number of blades N=16. In this impeller 10, for example, when it is excited by harmonics and a resonant state of ND=4 in Equation (1) is created, coupling of TW of ND=4 and the TW of ND=(−4) is likely to occur due to the closeness of the vibrational eigenvalues (natural frequencies). Therefore, since |(−4)−4|=|(−4)×2|=2×ND=8, it is necessary to aim such that the Fourier components do not include the eighth mode.

The first blades 16 and the second blades 18 are arranged along the circumference of the hub 12 alternately with a predetermined rule in such a manner that the mistune distribution that does not include a mistuned Fourier component having a wave number twice the nodal diameter number ND determined by Equation (1)

$$H+ND=nN \tag{1}$$

where H is the rotational order of resonance due to harmonic excitation (excitation rotational order), ND is the number of nodal diameters in the TW mode, n is an integer and N is the total number of the first blades 16 and second blades 18. Here N is an even number when ND≤N/2, and N is an odd number when ND≤(N−1)/2.

Once the number N of blades and the noteworthy rotational order H are determined by Equation (1), the nodal diameter number ND can be derived.

By positioning the first blades 16 and the second blades 18 with a predetermined regularity in the circumferential direction of the hub 12, the coupling between the traveling waves is cut, and a mistune distribution not containing mistune Fourier components 2×ND is created so that and an increase of AF at the time of harmonic resonance of the noteworthy rotational order H can be avoided. This reduces vibration during the rotation of the impeller 10 and improves the durability of the impeller 10.

FIG. 2 shows an example of the arrangement of the first blades 16 and the second blades 18 (Embodiment 1) when the noteworthy rotational order is set as H=4. In the first embodiment, pairs of mutually adjoining first blades 16 and pairs of mutually adjoining second blades 18 are arranged alternately arranged in the circumferential direction of the hub 12. This may be referred to as the every two alternating arrangement.

In the first embodiment where the number of blades N=16 and the noteworthy rotational order is set as H=4, ND=(−4) in Equation (1), and ND×2=|(−4)×2|=8. However, owing to the every two alternating arrangement, the 8th-order Fourier component does not appear. Thereby, an increase in AF during harmonic resonance of rotational order H=4 can be suppressed.

Figure 5:
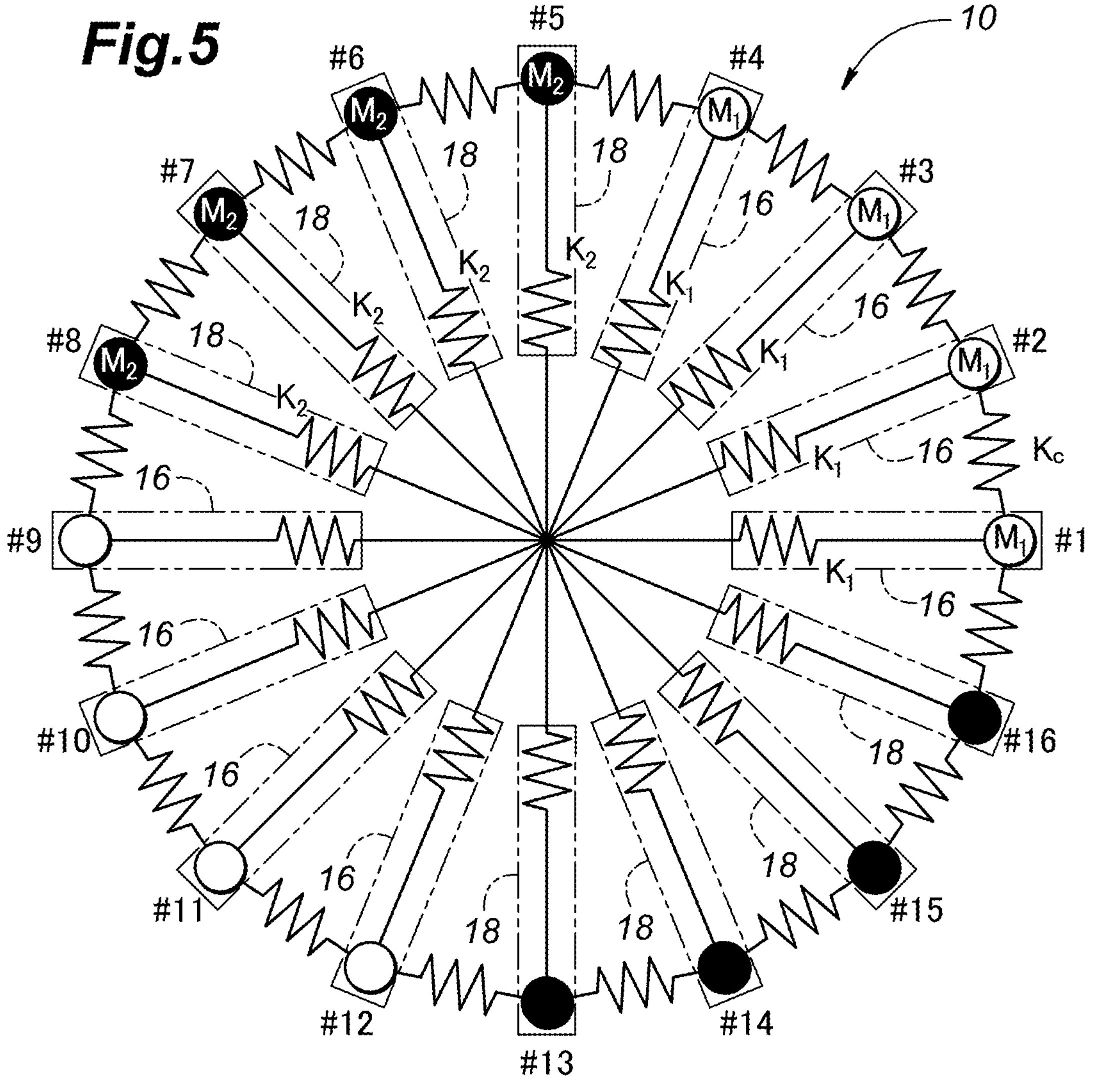
FIG. 5 is a vibration model diagram of the impeller of a second embodiment in which the first blades and the second blades are arranged alternately every four blades.

FIG. 5 shows a second embodiment of the impeller 10. In the second embodiment, the first blades 16 and the second blades 18 are arranged alternately every four blades in the circumferential direction of the hub 12.

In the second embodiment where the number of blades N=16 and the noteworthy rotational order is set as H=4, ND=(−4) in Equation (1), and ND×2=|(−4)×2|=8. However, owing to the every two alternating arrangement, the 8th-order Fourier component does not appear. Thereby, an increase in AF during harmonic resonance of rotational order H=4 can be suppressed.

In both the first and second embodiments, the first blades 16 and the second blades 18 have different vibrational eigenvalues, but since the first blades 16 and the second blades 18 are arranged symmetrically about the rotational center of the impeller 10, not only the above-mentioned effect can be obtained, but also no unbalanced load is applied to the impeller 10 when the impeller 10 rotates. As a result, the durability and quietness of the bearing portion of the impeller 10 can be ensured.

The present inventor has developed a simple method for intentional mistuning that aims to cut the coupling between TW modes and maintain the resonance response amplification factor AF at approximately 1.0 at the initial design stage when nothing is determined except for fundamental matters such as the number of blades, and the soundness of this approach was verified by using 1D/CAE tools. Note that "1D" here is not limited to one physical dimension but may also refer to investigating the behavior and function of a system simply by setting physical formulas and variables in an early design stage.

The mechanism of response amplification will be discussed in the following. The symbols used in the following discussion are defined as follows.

[M]: mass matrix
[K]: stiffness matrix
f(t): excitation force vector
N: number of sectors (number of blades)
Na: number of active modes
Kc: inter-sector (inter-blade) coupling stiffness matrix
Mb: sector (blade) mass matrix
Mc: inter-sector (inter-blade) coupling mass matrix
F: excitation force amplitude
ω: excitation angular frequency
Z: sector mode vector
m: number of degrees of freedom within sector
X: mode amplitude vector in spatial coordinates
ΔK: mistune stiffness matrix
ΔM: mistune mass matrix
A: TW mode amplitude vector
P: TW mode matrix
Ω: natural angular frequency matrix of traveling wave
j, κ, l, r: TW mode index First, the harmonic excitation response of a tuned system will be discussed in the following.

In a periodically symmetrical structure such as an impeller, each blade that can be considered as an individual identical structural element forming periodicity is called a sector. The vector whose components represent the displacement of a representative point of each sector (blade) is named as $\chi$, and it is assumed to cover the degrees of freedom within the sector. The equation of motion for the vector $\chi$ in the spatial coordinate system is represented by Equation (2).

$$[M]\ddot{x}+[K]x=f(t) \tag{2}$$

The TW mode with a wave number of K will be expressed as TW[κ], and K will be referred to as the TW mode index. When the number of sectors, that is, the number of blades of the impeller is N, the equation of motion (2) in the spatial coordinate system of the impeller subjected to excitation of rotational order H=r can be rewritten as Equation (3).

$$([K]-\omega^2[M])[X] = \tag{3}$$

$$\left(\begin{bmatrix} K_b & K_c & 0 & 0 & \dots & K_c^T \\ K_c^T & K_b & K_c & 0 & \dots & 0 \\ 0 & K_c^T & K_b & K_c & \dots & 0 \\ \vdots & \ddots & \ddots & \ddots & \dots & \vdots \\ 0 & \dots & & K_c^T & K_b & K_c \\ K_c & 0 & \dots & 0 & K_c^T & K_b \end{bmatrix} - \omega^2 \begin{bmatrix} M_b & M_c & 0 & 0 & \dots & M_c^T \\ M_c^T & M_b & M_c & 0 & \dots & 0 \\ 0 & M_c^T & M_b & K_c & \dots & 0 \\ \vdots & \ddots & \ddots & \ddots & \dots & \vdots \\ 0 & \dots & & M_c^T & M_b & M_c \\ M_c & 0 & \dots & 0 & M_c^T & M_b \end{bmatrix}\right) =$$

$$\begin{bmatrix} \sum_{k=1}^{N} Z_k e^{i(2\pi k/N)_1} \\ \sum_{k=1}^{N} Z_k e^{i(2\pi k/N)_2} \\ \vdots \\ \sum_{k=1}^{N} Z_k e^{i(2\pi k/N)_j} \\ \vdots \\ \sum_{k=1}^{N} Z_k e^{i(2\pi k/N)_N} \end{bmatrix} = \begin{Bmatrix} Fe^{i(2\pi r/N)_1} \\ Fe^{i(2\pi r/N)_2} \\ \vdots \\ Fe^{i(2\pi r/N)_j} \\ \vdots \\ Fe^{i(2\pi r/N)_N} \end{Bmatrix} + \begin{Bmatrix} \overline{F}e^{i(2\pi r/N)_1} \\ \overline{F}e^{i(2\pi r/N)_2} \\ \vdots \\ \overline{F}e^{i(2\pi r/N)_j} \\ \vdots \\ \overline{F}e^{i(2\pi r/N)_N} \end{Bmatrix}$$

The sector mode vector Z has an intra-sector degree of freedom (m) with regard to the sector mode (including the blade mode). The subscript κ represents the TW index. Using the TW mode matrix P represented by Equation (4) and the amplitude vectors A of the TW modes represented by Equation (5), the amplitude X of the TW mode in the spatial coordinate is expressed by Equation (6) given in the following. The equation of motion in the spatial coordinate system of Equation (3) is replaced by the equation of motion or Equation (7) in the modal coordinate system of the TW mode.

$$P = \tag{4}$$

$$\frac{1}{\sqrt{N}}\begin{bmatrix} P_1 e^{i(2\pi 1/N)_1} & P_2 e^{i(2\pi 1/N)_1} & \dots & P_r e^{i(2\pi 1/N)_1} & \dots & P_N e^{i(2\pi 1/N)_1} \\ P_1 e^{i(2\pi 1/N)_2} & P_2 e^{i(2\pi 1/N)_2} & \dots & P_r e^{i(2\pi 1/N)_2} & \dots & P_N e^{i(2\pi 1/N)_2} \\ \vdots & \vdots & \dots & \vdots & \dots & \vdots \\ P_1 e^{i(2\pi 1/N)_j} & P_2 e^{i(2\pi 1/N)_j} & \dots & P_r e^{i(2\pi 1/N)_j} & \dots & P_N e^{i(2\pi 1/N)_j} \\ \vdots & \vdots & \dots & \vdots & \dots & \vdots \\ P_1 e^{i(2\pi 1/N)_N} & P_2 e^{i(2\pi 1/N)_N} & \dots & P_r e^{i(2\pi 1/N)_N} & \dots & P_N e^{i(2\pi 1/N)_j} \end{bmatrix}$$

where $P_k=[Z_{k1}|Z_{k2}|\cdots|Z_{km}](k=1,\cdots, N)$ $$A = \sqrt{N}\begin{bmatrix} A_1 \\ A_2 \\ \vdots \\ A_r \\ \vdots \\ A_N \end{bmatrix} \tag{5}$$

$$X=PA \tag{6}$$

$$\begin{bmatrix} \Omega_1^2-\omega^2 I & & \dots & 0 \\ 0 & \Omega_2^2-\omega^2 I & \dots & 0 \\ \vdots & \ddots & & \vdots \\ \vdots & \Omega_r^2-\omega^2 I & & \vdots \\ \vdots & & \ddots & \vdots \\ 0 & \dots & & \Omega_N^2-\omega^2 I \end{bmatrix}\begin{bmatrix} A_1 \\ A_2 \\ \vdots \\ A_r \\ \vdots \\ A_N \end{bmatrix} = \begin{bmatrix} 0 \\ 0 \\ \vdots \\ P_r^H F \\ \vdots \\ 0 \end{bmatrix} \tag{7}$$

Here, subscript H represents a transposed matrix of complex conjugate.

For the excitation of H=r, based on the balance of force for the TWr mode, the r-th row of Equation (7) is given by Equation (8). For other TW modes, the r-th row of Equation (7) is given by Equation (9). Therefore, the response amplitude (amplitude vector) A to the excitation of H=r is given by Equation (10), and it can be seen that in a tuned system, only the TWr mode responds to the excitation of H=r.

$$(\Omega_r^2-\omega^2 I)A_r = P_r^H F \tag{8}$$

$$(\Omega_j^2-\omega^2 I)A_j = 0 \quad (j \neq r) \tag{9}$$

$$\begin{cases} A_r = [\Omega_r^2-\omega^2 I]^{-1} P_r^H F \\ A_j = 0 \end{cases} \quad (j \neq r) \tag{10}$$

In a mistuned system, there are variations in stiffness and mass between blades. In the case of a mistuned system, the equation of motion or Equation (3) of a tuned periodic symmetric structure in the spatial coordinate, which takes into account the harmonic excitation force, can be rewritten as Equation (11) given below.

$$([K+\Delta K]-\omega^2[M+\Delta M])[X]=F \tag{11}$$

Here, the mistune stiffness matrix AK and the mistune mass matrix ΔM are matrices composed of the differences from the average values regarding the stiffnesses and masses of the respective blades shown in Equation (12) and will be referred to as mistune matrices hereinafter.

$$\begin{cases} \Delta K = \begin{bmatrix} \Delta K_1 & 0 & 0 & \dots & 0 \\ 0 & \Delta K_2 & 0 & \dots & 0 \\ & & \ddots & & \\ 0 & 0 & 0 & \dots & \Delta K_N \end{bmatrix} \\ \Delta M = \begin{bmatrix} \Delta M_1 & 0 & 0 & \dots & 0 \\ 0 & \Delta M_2 & 0 & \dots & 0 \\ & & \ddots & & \\ 0 & 0 & 0 & \dots & \Delta M_N \end{bmatrix} \end{cases} \tag{12}$$

Similarly to the case of a tuned system, the equation of motion of a mistuned system expressed in a modal coordinate system regarding the TW mode can be rewritten as Equation (13) given below.

$$\left(\begin{bmatrix} \Omega_1^2-\omega^2 I & & \dots & 0 \\ 0 & \Omega_2^2-\omega^2 I & \dots & 0 \\ \vdots & \ddots & & \vdots \\ \vdots & \Omega_r^2-\omega^2 I & & \vdots \\ \vdots & & \ddots & \vdots \\ 0 & \dots & & \Omega_N^2-\omega^2 I \end{bmatrix} + \Delta\right)\begin{bmatrix} A_1 \\ A_2 \\ \vdots \\ A_r \\ \vdots \\ A_N \end{bmatrix} = \begin{bmatrix} 0 \\ 0 \\ \vdots \\ P_r^H F \\ \vdots \\ 0 \end{bmatrix} \tag{13}$$

Here, A is represented in the form of Equation (14) and may be considered as a modal parameter newly created by the mistune matrices of Equation (12).

$$\Delta = P^H(\Delta K - \omega^2 \Delta M)P = \begin{bmatrix} 0 & \Delta_{12} & \Delta_{13} & \ldots & \Delta_{1N} \\ \Delta_{21} & 0 & \Delta_{23} & \ldots & \Delta_{2N} \\ \Delta_{31} & \Delta_{32} & 0 & \ldots & \Delta_{3N} \\ \vdots & & & \ddots & \vdots \\ \Delta_{N1} & \Delta_{N2} & \Delta_{N3} & \ldots & 0 \end{bmatrix} \tag{14}$$

By carefully looking at the components (Δκj) of (κ, j) in this matrix, it can be seen by expanding the first half of Equation (14) that the term (Δκj_ΔK) derived from the mistuned stiffness matrix AK and the term (Δκj_ΔM) derived from the mistuned mass matrix ΔM have the forms of Equations (15) and (16), respectively. Thus, these terms Δκj can be understood as modal parameters produced owing to the involvement of the TWκ mode and the TWj mode. It can be understood that what mediates these two TW modes is a Fourier component corresponding to a wave of wave number (κ-j) in the mistune distribution over the entire circumference.

$$\begin{aligned} \Delta_{kj\_}\Delta K = P^H(\Delta K)P_{(k,j)} = \frac{1}{N}P_k\{\Delta K_1 e^{-i(2\pi(k-j)/N)_1} + \\ \Delta K_2 e^{-i(2\pi(k-j)/N)_2} + \ldots + \Delta K_N e^{-i(2\pi(k-j)/N)_N}\}P_j = \\ \frac{1}{N}P_k\sum_{l=1}^{N}\{\Delta K_l e^{-i(2\pi(k-j)/N)l}\}P_j = P_k^H(\Delta K_{k-j}{}^{fourier})P_j \end{aligned} \tag{15}$$

$$\begin{aligned} \Delta_{kj\_}\Delta M = P^H(-\omega^2\Delta M)P_{(k,j)} = \\ \frac{-\omega^2}{N}P_k\sum_{l=1}^{N}\{\Delta M_l e^{-i(2\pi(k-j)/N)_l}\}P_j = -\omega^2 P_k^H(\Delta M_{k-j}{}^{fourier})P_j \end{aligned} \tag{16}$$

The force balance of the TWr mode with respect to the excitation of H=r, or the r-th row of Equation (13) becomes Equation (17). It can be seen from Equation (17), the TWr mode and all other TWs (κ=1, 2 . . . , N, κ±r) are involved in the balance of forces owing to the coupling between them via mistune Fourier components corresponding to the waves having wave numbers of the differences (r−κ) in their TW mode indexes. In regard to both the first blades 16 and the second blades 18, in addition to the vibration corresponding to the amplitude vector Ar, the vibration corresponding to the response amplitudes A1 to AN of the TW modes drawn into these couplings are superimposed on the each blade, and the amplification or attenuation from the tuned system occurs in the response of each of the first blades 16 and the second blades 18.

$$\begin{aligned} (\Omega_r^2 - \omega^2 I)A_r + P_r^H(\Delta K_{r-1}{}^{fourier} - \omega^2\Delta M_{r-1 fourier})P_1 A_1 + \\ P_r^H(\Delta K_{r-2}{}^{fourier} - \omega^2\Delta M_{r-2 fourier})P_2 A_2 + \ldots + \\ P_r^H(\Delta K_{r-N}{}^{fourier} - \omega^2\Delta M_{r-N fourier})P_N A_N = P_r^H F \end{aligned} \tag{17}$$

In general, when the number of blades of a tuned impeller is N, a TW mode having the nodal diameter number ND in Equation (1) as an index responds to the rotational order H. This will be referred to as the TW mode that should have originally responded.

The resonance response amplification factor AF in the harmonic resonance response of each blade can be considered to be generated by the coupling between the original TW mode induced by the mistune Fourier components contained in the mistune distribution along the circumference of the impeller and other TW modes with other TW modes. The induced mistune Fourier components may be considered as mistune Fourier components that have wave numbers corresponding to the differences between the TW mode indexes of the two TW modes that are involved in the coupling. The responses of the different TW modes are superimposed on each blade so that the response amplification and attenuation from the tuned system is caused in each blade and this leads to the variations in the resonance response amplification factor AF.

The maximum value of the resonance response amplification factor AF is given as (1+√N)/2, and the TW modes that respond in a coupled manner are limited to those close to the excitation frequency, and are called active modes, the maximum values of the AF the resonance response amplification factors being given by (1+√Na)/2 (where Na is the active mode number). The maximum number of nodal diameters ND that an impeller can have is given as, for example, N/2 when the number of blades N is an even number, so the number of TW modes that can be active modes is N ranging from −N/2 to N/2. In other words, the maximum number of active modes can be said to be the number N of blades.

An intentional mistune for suppressing the response amplification from the tuned system may aim, for the purpose of severing the coupling between the TW modes, at identifying the TW modes (TW_ND) which should originally respond to the resonance rotational order number H as well as the TW modes existing in the adjoining frequencies (or the modes that can be an active mode) and forming a mistune distribution that does contain mistune Fourier components of the wave numbers corresponding to the difference between the indexes.

This analysis can be performed through eigenvalue analysis at an early stage of development preceding the actual fabrication. In particular, the TW_ND modes that originally respond and the conjugates TW_(ND) mode thereof generally have close eigenvalues (are identical in a tuned system), and are most likely to be active modes particularly in a mistuned system without regard to the characteristics of the impeller (magnitudes of the coupling between the blades). Therefore, as shown in Equation (18), for intentional mistuning, eliminating the 2×ND components from the mistuned Fourier components will suppress an increase in the resonance response amplification factors AF regardless of the characteristics of the impeller. Such considerations can be made at an early stage of development such as when determining the number of blades.

$$ND-(-ND)=2\times ND \tag{18}$$

A specific example where active modes are coupled is shown below. Assuming that H=4, N=16, and n=0, since ND=(−)4, the TW (−)4 mode is the TW mode that originally responds in the tune system. In a mistuned system, the TW4 mode, which has a conjugate thereto, is thought to exist at a close frequency, and this has the possibility of becoming an active mode and involving with the coupling (see FIG. 4). Since the difference between the two TW indexes is 4−(−) 4=8 when the mistune distribution has a mistune Fourier component 8, coupling between these two TW modes is induced with the result that an amplification of the response from the tuned system may be caused. Therefore, it should be possible to break the coupling between the TW modes and suppress response amplification from the tuned system by forming a distribution that does not include the mistuned Fourier component 8 for intentional mistuning.

However, the formation of distributions that include mistune magnitude as a variable can have a huge number of combinations and is unrealistic from both processing control and quality control perspectives. Therefore, in this embodiment, two types of blade sets are used: designed blades and blades with manageable eigenvalue differences in parts where the influence of shape differences, etc. can be tolerated. Based on the arrangement management of these blades, 2×ND mistuned Fourier components are eliminated.

Next, evaluation of resonance response amplification factor changes during harmonic excitation due to differences in mistuned Fourier components that occur depending on how to create intentional mistuning will be discussed in the following.

In this evaluation process, the response of a tuned system under harmonic excitation to be evaluated is acquired, and then, the response of a randomly mistuned system produced as a result of inevitable mistuning under a same harmonic excitation is acquired. At this time, the maximum value of the amplitude is read, and the resonance response amplification factor AF due to random mistuning is calculated from the ratio to the tuned system response.

From the investigation of the change in the resonance response amplification factor AF with respect to the magnitude of the random mistune, the magnitude of the random mistune that appears to have a very small contribution to the change in the resonance response amplification factor AF was evaluated, and this was selected as the eigenvalue difference of the intentional mistune. Multiple patterns of intentional mistuning using different arrays of the two types of blades having different eigenvalues were prepared, excitation responses of notable rotational orders were acquired from the systems in which intentional mistuning is added to random mistuning, and the resonance response amplification factor AF was computed for each pattern of intentional mistuning.

In these evaluation processes, two types of impellers with different characteristics were selected in order to investigate the difference in the resonance response amplification factors AF depending on the number of active modes. Furthermore, in order to eliminate chance occurrences, three types of random mistune were considered as unavoidable random mistunes.

In a number of literatures which deal with the vibrations of the blades of an impeller which in reality behaves as a continuous object, when the attention is directed to the evaluation of the property of the impeller as a cyclic symmetric structure, a model is employed which has a reduced number of degrees of freedom of motion by representing the symmetric structure with discrete masses and springs. In this embodiment also, the model shown in FIG. 2 was employed where each sector is represented by a discrete mass and a spring. Thus, each sector has a single degree of freedom of motion. The number of sectors (number of blades) N was set to 16.

In this evaluation process, a harmonic excitation simulation was performed using Amesim Version 2021.2 as a 1D simulation tool. In the actual 1D simulation model, the blade mass was replaced with the moment of inertia, and for the stiffness, the rotational stiffnesses were used for the direct stiffness Kd and the coupling stiffness (spring constant) between the blades Kc. These stiffnesses are determined by the spring constants K1 and K2. As for mistuning, the moment of inertia of each blade was adjusted to create the eigenvalue differences. The damping coefficient was given so that Qfactor≈500 (half-width≈0.1%) in the TW mode "4" of the tuned impeller, and was divided into the direct damping coefficient Cd and the coupled damping coefficient Cc between the blades each in the form of a rotational damping coefficient such that the ratio (Cc/Cd) of these damping coefficient is equal to the ratio (Kc/Kd) of the inter-blade coupled stiffness Kc to the direct stiffness Kd. In evaluating the response, the amplitude of the excitation force was kept constant at a unit torque, and a frequency sweep was performed with a phase difference corresponding to an arbitrary harmonic excitation. The frequency sweep rate was 5 [Hz/s] for resonance passage around 1,345 [Hz]. For the response, the maximum value of the response angular amplitudes of the 16 blades was read, and the resonance response amplification factor AF was calculated from the ratio of the maximum value to the angular amplitude of the tuned system.

As an evaluation target to investigate the difference in the resonance response amplification factor AF depending on the number of active modes, two types of impellers with different characteristics were selected. The number of blades N of these two types of impellers were both 16, but the two types of impellers have different ratios (Kc/Kd) of the inter-blade coupling stiffness Kc to the direct stiffness Kd supported at the center. The one with a large ratio (Kc/Kd) will be called "Strong" and the one with a small ratio will be called "Light". The (Kc/Kd) of "Strong" was 1.887, and the (Kc/Kd) of "Light" was 0.038. Table 1 shows the characteristics of the two types of impellers. Table 2 shows the types of mistune given to the two types of impellers. In Table 2, the label IM2 indicates the every two alternating arrangement of the first embodiment, and the label IM4 indicates the every four alternating arrangement of the second embodiment.

TABLE 1

| | | | |
|---|---|---|---|
| impeller type | | Strong | Light |
| number of blades | | 16 | 16 |
| Kc/Kd | | 1.887 | 0.038 |
| tuned system | natural frequency (Hz) | 1345.1 | 1345.1 |
| TW_4 mode | quality factor | 488 | 502 |

TABLE 2

| mistune | random mistune (RM) | blade arrangement label | blade arrangement pattern |
|---|---|---|---|
| RM | ±0.05% | | |
| | ±0.10% | | |
| | ±0.50% | | |
| | ±1.00% | | |
| | ±2.00% | | |
| | ±5.00% | | |
| RM + IM | ±0.50% | IM2 | every two |
| | | IM4 | every four |

Figure 6:
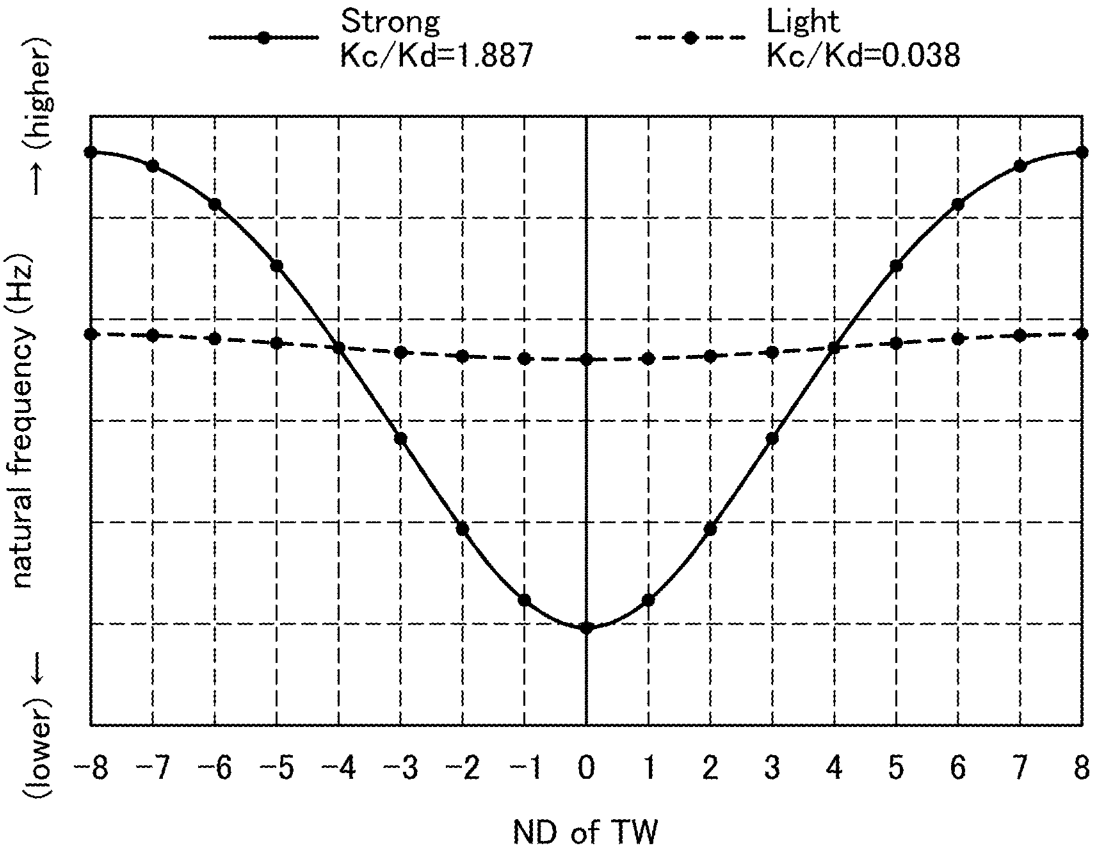
FIG. 6 is a graph showing the natural frequency characteristics of two different impellers in a traveling wave mode.

FIG. 6 shows the relationship between the TW mode and the eigenvalue of these two types of impellers. Here, adjustment was made so that the eigenvalues of the TW mode_4 were the same for the two types of impellers. For the "Light" impeller, all possible TW modes existed within a narrow frequency range of ±1.9% relative to the eigenvalue of TW mode_4. This suggests that during harmonic excitation response as a mistuned system, more TW modes are drawn into coupling as active modes, and the resonance response amplification factor AF of the "Weak" impeller becomes larger than that of the "Strong" impeller.

The resonance response amplification factor AF was acquired by harmonic excitation simulation with random mistuning based on unavoidable random mistuning during operation. In order to eliminate chance occurrences, three types of random mistunes (RM1, RM2, RM3) were assumed. For the three types of random mistunes, three sets of 16 random numbers were generated, and the distribution of each set was directly scaled to the magnitude of the arbitrary random mistune. Here, the magnitude of random mistune is defined as the difference between the eigenvalue ωj of the j-th blade and the average value Wave of the eigenvalues of all the blades as shown in Equation (19).

$$RM\ \text{Level}=\{(|\omega\_j-\omega_{ave}|_{max})/\omega_{ave}\}\times 100[\%] \quad (19)$$

Figure 7:
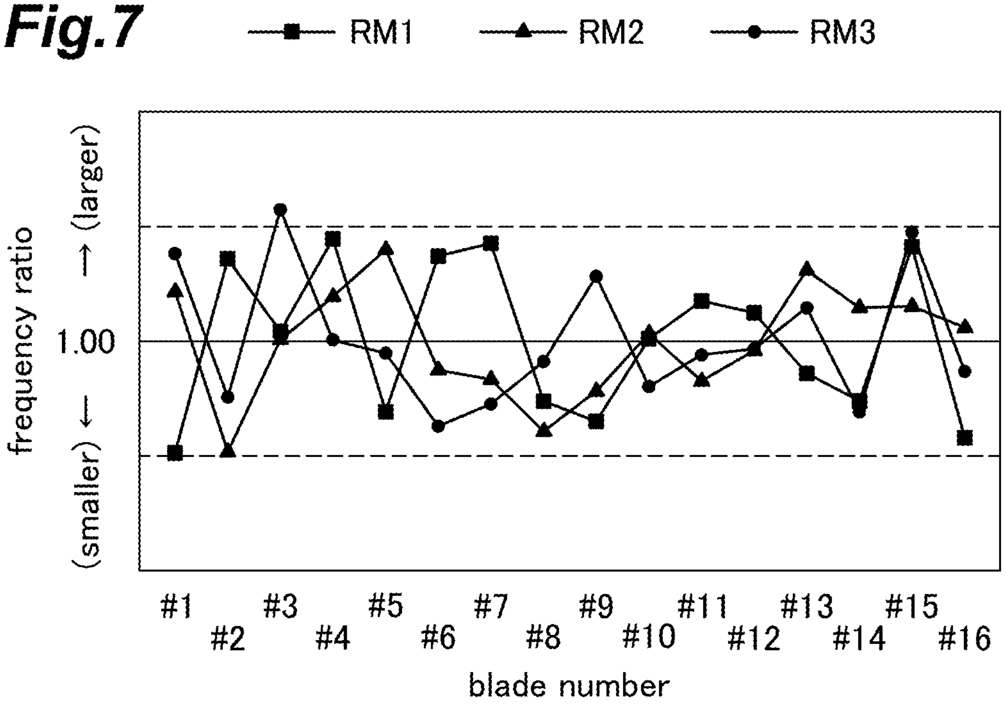
FIG. 7 is a graph showing the natural frequency ratios of the different blades in three randomly mistuned systems.
Figure 8C:
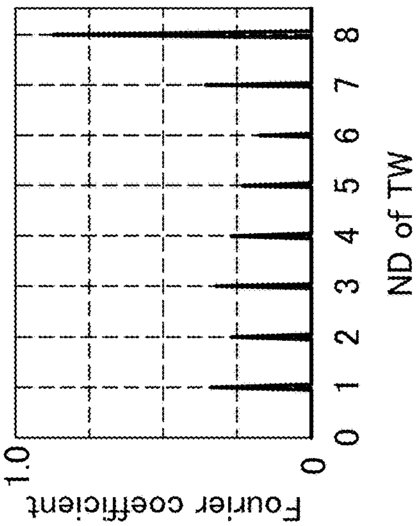
FIGS. 8A to 8C are graphs showing unavoidable Fourier components of three randomly mistuned systems.
Figure 8B:
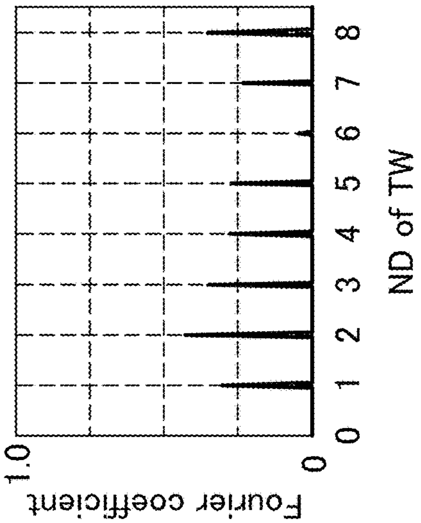
Figure 8A:
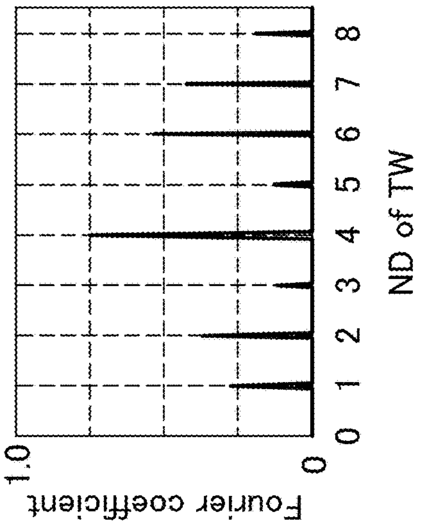

FIG. 7 shows three types of random mistune distributions used in the evaluation. FIG. 7 shows an example in which the magnitude of random mistune is ±0.5%. FIGS. 8A to 8C show mistune Fourier components (mistune Fourier components) of random mistunes (RM1, RM2, RM3). This suggests that random mistuning includes many mistuned Fourier components and may draw many TW modes into coupling as active modes.

As a simple intentional mistune IM for the purpose of suppressing the resonance response amplification factor AF, the above-mentioned two types of blade arrangement management were taken into consideration, and changes in the resonance response amplification factors AF during excitation due to the differences in the mistuned Fourier components generated in dependence on the arrangement of the two types of blade were evaluated.

Here, the intentional mistune IM was created by changing the arrangement of two types of blades: the original blades and the blades with a higher eigenvalue (+5%). The magnitude of intentional mistune IM is defined by Equation (20).

$$\text{IM level}=\{|\omega j-\omega_{org}|_{max}/\omega_{org}\}\times 100[\%] \quad (20)$$

Figure 9A:
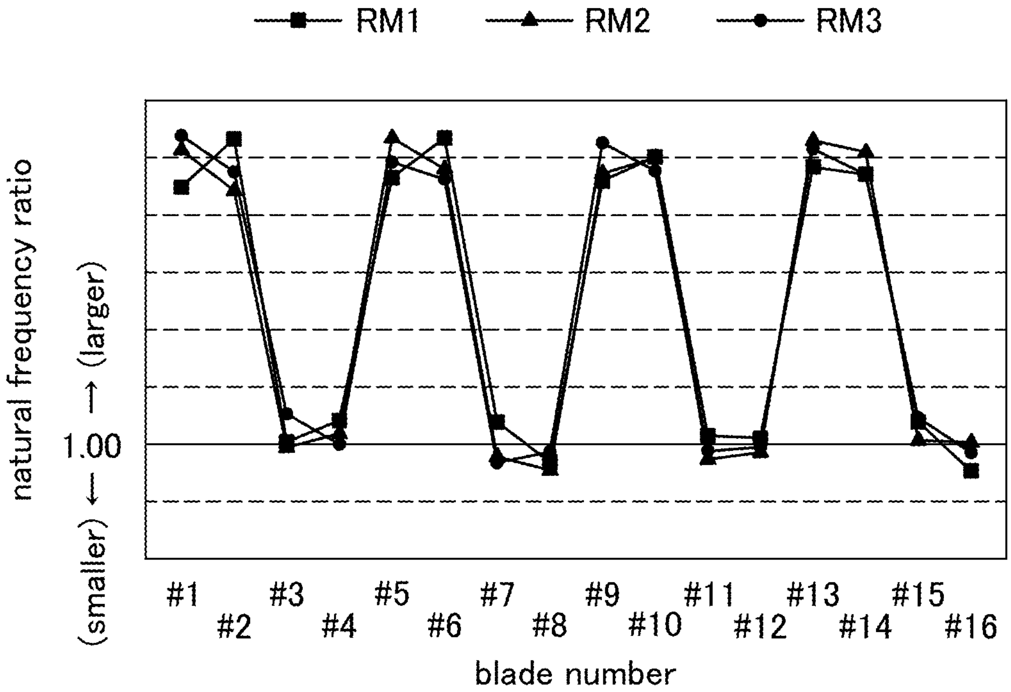
FIG. 9A is a graph showing the distributions of natural frequencies in the first embodiment.
Figure 9B:
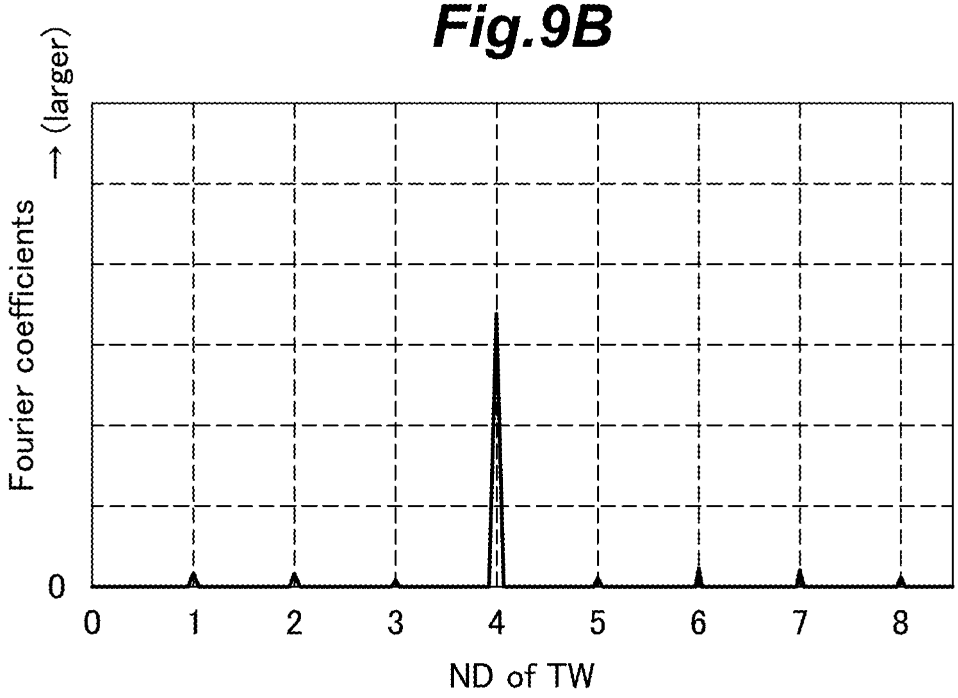
FIG. 9B is a graph showing the mistuned Fourier component vibration characteristics in the first embodiment.
Figure 10A:
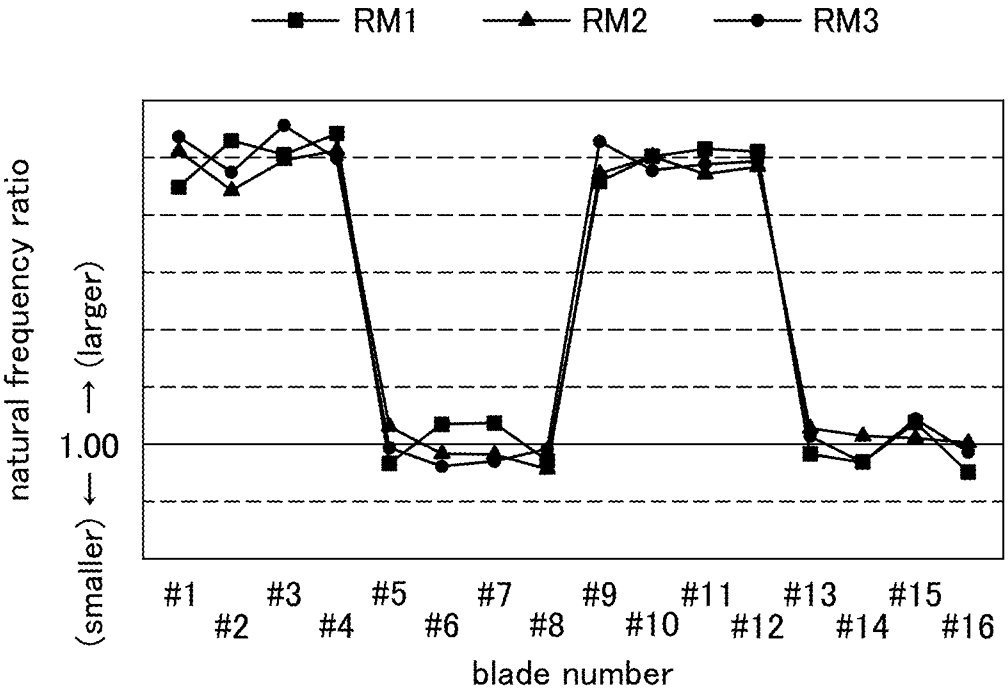
FIG. 10A is a graph showing the distributions of natural frequencies in the second embodiment.
Figure 10B:
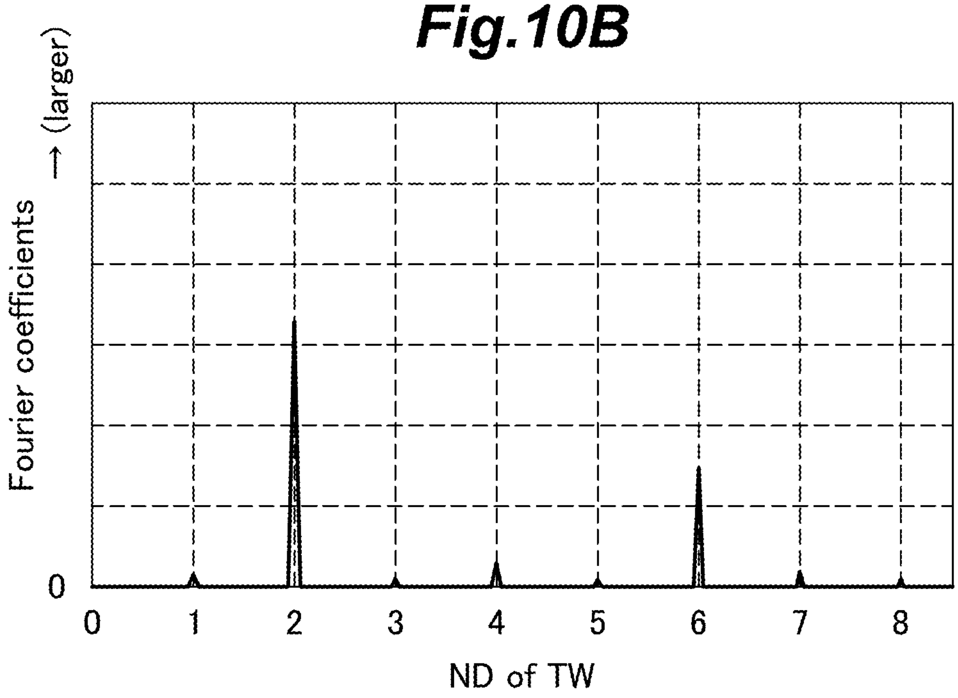
FIG. 10B is a graph showing the mistuned Fourier component vibration characteristics in the second embodiment.

FIGS. 9 and 10 show the mistune distributions and mistune Fourier components of an impeller with intentional mistune added to random mistune. In the mistune Fourier components shown in FIGS. 9B and 10B, the case where the intentional mistune IM is added to RM1 out of the three types of random mistune is shown as a representative example. Compared to the random mistune shown in FIG. 8, the intended mistune demonstrated substantially reduced Fourier components suggesting that the TW modes that attract coupling are reduced.

Next, the method for manufacturing the impeller 10 of this embodiment will be described in the following. This manufacturing method of the impeller 10 includes the steps of preparing the hub 12 shown in FIG. 1, preparing a plurality of first blades 16 each having a first vibrational eigenvalue and a plurality of second blades 18 each having a second vibrational eigenvalue different from the first vibrational eigenvalue, and alternately arranging the first blades 16 and the second blades 18 at regular intervals in the circumferential direction of the rotatable hub 12 with a prescribed regularity as described above so as to achieve a mistune distribution that does not include a mistuned Fourier component having a wave number twice the nodal diameter number ND determined by Equation (1).

In the manufacturing process of this impeller 10, once the number N of blades and the noteworthy rotational order H are determined, the nodal diameter number ND is derived. Therefore, regardless of the configuration or vibration mode of the impeller 10, one can obtain an impeller 10 having a blade arrangement with intentional mistuning that restricts an increase in the AF in a harmonic resonance of the noteworthy rotational order.

Although the present invention has been described above with reference to preferred embodiments thereof, as will be easily understood by those skilled in the art, the present invention is not limited to such embodiments, and may be modified in various ways without departing from the scope of the present invention.

For example, the total number of the first blades 16 and second blades 18 is not limited to 16 but may be any other number. Further, the first blades 16 and the second blades 18 may be arranged so as to alternate in different manners. For instance, the first blades 16 and the second blades 18 may singly alternate along the circumference, or alternate every three blades, every five blades, etc., depending on the total number of the first blades 16 and second blades 18. The first blades 16 and the second blades 18 may be integrally provided on the rotatable hub 12 by machining or the like or may be formed as separate parts that are attached to the rotatable hub 12 by form engagement or welding. The first blades 16 and the second blades 18 may also be formed so to project radially inward from the inner circumferential surface of a cylindrical part formed in the rotor hub 12.

The contents of the original Japanese patent application on which the Paris Convention priority claim is made for the present application as well as the contents of the prior art references mentioned in this application are incorporated in this application by reference.

The invention claimed is:

1. An impeller, comprising:

a rotatable hub; and a plurality of blades provided circumferentially on the rotatable hub at regular intervals, the blades including first blades each having a first vibrational eigenvalue and second blades each having a second vibrational eigenvalue, wherein the first blades and the second blades are circumferentially arranged with a predetermined regularity in a circumferential direction in an alternating manner and with a mistune distribution that does not include a mistune component having a wavenumber twice a number of nodal diameters computed from $$H+ND=nN$$

where H is a rotational order of resonance under harmonic forced vibration, ND is a nodal diameter number in a traveling wave (TW) mode, n is an integer and N is a number of the blades.

2. The impeller according to claim 1, wherein the first blades and the second blades are arranged alternately every two blades.

3. The impeller according to claim 1, wherein the first blades and the second blades are arranged alternately every four blades.

4. A method for manufacturing an impeller, the method comprising the steps of:

preparing a rotatable hub;

preparing a plurality of first blades each having a first vibrational eigenvalue and a plurality of second blades each having a second vibrational eigenvalue different from the first vibrational eigenvalue;

positioning the first blade and the second blade with a predetermined regularity in a circumferential direction in an alternating manner so as to achieve a mistune distribution that does not contain a mistune Fourier component having a wave number twice a node diameter number ND as determined by a following equation $$H+ND=nN$$

where H is a rotational order of resonance under harmonic forced vibration, ND is a nodal diameter number in a traveling wave (TW) mode, n is an integer and N is a number of the blades.

* * * * *